US012582984B1

(12) United States Patent
Nowakowski

(10) Patent No.: US 12,582,984 B1
(45) Date of Patent: Mar. 24, 2026

(54) METHOD FOR LYOPHILIZATION AND DEVICE THEREOF

(71) Applicant: Argonaut Manufacturing Services, Inc., Carlsbad, CA (US)

(72) Inventor: Mark Nowakowski, San Diego, CA (US)

(73) Assignee: Argonaut Manufacturing Services, Inc., Carlsbad, CA (US)

( * ) Notice: Subject to any disclaimer, the term of this patent is extended or adjusted under 35 U.S.C. 154(b) by 329 days.

(21) Appl. No.: 17/364,615

(22) Filed: Jun. 30, 2021

Related U.S. Application Data

(60) Provisional application No. 63/047,720, filed on Jul. 2, 2020.

(51) Int. Cl.
| | |
|---|---|
| *B01L 3/00* | (2006.01) |
| *B01L 7/00* | (2006.01) |
| *G01N 1/42* | (2006.01) |
| *G01N 35/02* | (2006.01) |
| *G01N 35/00* | (2006.01) |

(52) U.S. Cl.
CPC ........... *B01L 3/502715* (2013.01); *B01L 7/50* (2013.01); *G01N 1/42* (2013.01); *G01N 35/02* (2013.01); *B01L 2300/0829* (2013.01); *B01L 2300/1894* (2013.01); *G01N 2035/00445* (2013.01)

(58) Field of Classification Search
CPC ........................... B01L 2300/1894; B01L 7/50
See application file for complete search history.

(56) References Cited

U.S. PATENT DOCUMENTS

| | | | |
|---|---|---|---|
| 6,190,878 B1* | 2/2001 | Pierson | C12M 23/12 |
| | | | 435/283.1 |
| 6,372,513 B1 | 4/2002 | Nguyen et al. | |
| 6,656,744 B2 | 12/2003 | Pronovost et al. | |
| 6,924,153 B1 | 8/2005 | Boehringer et al. | |
| 7,229,603 B2 | 6/2007 | Kuperus et al. | |
| 7,344,893 B2 | 3/2008 | Kirkegaard et al. | |
| 7,354,597 B2 | 4/2008 | Johnson et al. | |
| 7,537,937 B2 | 5/2009 | Jerome et al. | |
| 7,858,396 B2 | 12/2010 | Corstjens et al. | |
| 7,910,381 B2 | 3/2011 | Ford et al. | |
| 8,153,444 B2 | 4/2012 | Kirkegaard et al. | |
| 8,580,572 B2 | 11/2013 | Lappalainen | |
| 8,822,151 B2 | 9/2014 | Sambursky et al. | |
| 8,846,319 B2 | 9/2014 | Mehra et al. | |
| 9,625,210 B2 | 4/2017 | Kuu et al. | |
| 9,709,562 B2 | 7/2017 | Jakubowicz et al. | |
| 9,915,657 B2 | 3/2018 | Marr et al. | |
| 9,944,922 B2 | 4/2018 | Cary | |
| 9,989,527 B2 | 6/2018 | Petruno et al. | |
| 10,073,091 B2 | 9/2018 | Ding et al. | |
| 2002/0064482 A1 | 5/2002 | Tisone et al. | |
| 2005/0210962 A1 | 9/2005 | Bohm et al. | |
| 2007/0259348 A1* | 11/2007 | Phadke | F26B 5/065 |
| | | | 435/6.12 |
| 2009/0041619 A1 | 2/2009 | Cady et al. | |
| 2009/0136386 A1 | 5/2009 | Duffy et al. | |
| 2009/0162532 A1 | 6/2009 | Mosoiu et al. | |
| 2009/0191643 A1 | 7/2009 | Boehm et al. | |
| 2009/0325263 A1 | 12/2009 | Ponaka et al. | |
| 2010/0044918 A1 | 2/2010 | Lee et al. | |
| 2010/0112717 A1 | 5/2010 | Augstein et al. | |
| 2010/0136554 A1 | 6/2010 | Parthasarathy et al. | |
| 2011/0155620 A1 | 6/2011 | Kuu | |
| 2012/0149603 A1 | 6/2012 | Cooney et al. | |
| 2012/0184462 A1 | 7/2012 | O'Farrell et al. | |
| 2013/0102062 A1 | 4/2013 | Kojima et al. | |
| 2016/0184789 A1 | 6/2016 | Takagi et al. | |
| 2016/0320415 A1 | 11/2016 | Manneh | |
| 2017/0333898 A1 | 11/2017 | Saleh et al. | |
| 2019/0134634 A1 | 5/2019 | Iqbal et al. | |
| 2019/0224673 A1 | 7/2019 | Weber et al. | |
| 2020/0093748 A1 | 3/2020 | Joshi-Hangal et al. | |
| 2020/0376485 A1 | 12/2020 | Azpiroz et al. | |
| 2021/0032685 A1 | 2/2021 | Knight et al. | |
| 2023/0279514 A1 | 9/2023 | Nowakowski | |
| 2024/0294996 A1 | 9/2024 | Nowakowski | |
| 2025/0091043 A1 | 3/2025 | Nowakowski | |

FOREIGN PATENT DOCUMENTS

| | | |
|---|---|---|
| CN | 102764240 | 11/2012 |
| DE | 102016211357 A1 | 12/2017 |
| EP | 3812468 | 4/2021 |
| EP | 3949732 | 2/2022 |
| EP | 3981414 | 4/2022 |
| TW | 201317531 | 5/2013 |
| WO | WO 200159159 A2 | 8/2001 |
| WO | WO 2021/221629 A1 | 11/2021 |
| WO | WO 2022/232585 | 3/2023 |
| WO | WO 2023/167945 A1 | 9/2023 |

OTHER PUBLICATIONS

U.S. Appl. No. 18/358,885, filed Jul. 25, 2023, by Nowakowski.

(Continued)

*Primary Examiner* — Natalia Levkovich

(74) *Attorney, Agent, or Firm* — Morrison & Foerster LLP

(57) ABSTRACT

The present disclosure provides a method of generating lyophilized reagents in a multiwell substrate.

11 Claims, 3 Drawing Sheets

(56) References Cited

OTHER PUBLICATIONS

International Preliminary Report on Patentability mailed Sep. 12, 2024, directed to International Application No. PCT/US2023/014300, 10 pages.

International Search Report and Written Opinion mailed Nov. 1, 2024, directed to International Application No. PCT/US2024/045309, 12 pages.

Nowak et al., "The Freeze-Drying of Foods—The Characteristic of the Process Course and the Effect of Its Parameters on the Physical Properties of Food Materials," Foods. (Oct. 18, 2020) 9(10):1488, 34 pages.

Nowakowski, U.S. Office Action mailed Aug. 22, 2024, directed to U.S. Appl. No. 18/358,885:13 pages.

Nowakowski, U.S. Office Action mailed Dec. 16, 2024, directed to U.S. Appl. No. 18/358,885:13 pages.

Sasmazel et al., "Atmospheric Pressure Plasma Surface Treatment of Polymers and Influence on Cell Cultivation," Molecules (Mar. 2021) 26(6): 1665, 25 pages.

Herrmann Ultrasonics, Inc., "Which plastics are suitable for welding?" Downloaded on May 29, 2025, 6 pages. https://www.herrmannultrasonics.com/en-us/welding-using-ultrasonics/welding-plastics/which-plastics-are-suitable-for-welding.

Nowakowski, U.S. Office Action mailed Jun. 4, 2025, direct to U.S. Appl. No. 18/358,885:11 pages.

* cited by examiner

METHOD FOR LYOPHILIZATION AND DEVICE THEREOF

CROSS-REFERENCE TO RELATED APPLICATION(S)

This application claims benefit of priority under 35 U.S.C. § 119 (e) of U.S. Provisional Patent Application Ser. No. 63/047,720, filed Jul. 2, 2020. The disclosure of the prior application is considered part of and is incorporated by reference in the disclosure of this application.

BACKGROUND OF THE DISCLOSURE

Field of the Disclosure

The disclosure relates generally to lyophilized reagents, and more specifically to a method for lyophilizing liquid reagent in a multiwell substrate and manipulating and/or transporting the lyophilized reagent using automation.

BACKGROUND INFORMATION

Numerous methods and systems have been developed for conducting chemical, biochemical, and/or biological assays. These methods and systems are essential in a variety of applications including medical diagnostics, food and beverage testing, environmental monitoring, manufacturing quality control, drug discovery, drug delivery and basic scientific research.

It is desirable that assay methods and devices have one or more of the following characteristics: 1) high throughput; 2) high sensitivity; 3) high precision and/or accuracy; 4) low cost; 5) low consumption of reagents; 6) multiplexing capability; 7) stability of reagents; and 8) shippability at room temperature. It is also desirable in many applications that these types of performance benefits are achieved with assay formats that are easy to carry out, are amenable to automation, use stable dry reagents, are efficient and less costly to manufacture and/or require little or no manipulation before use.

A variety of approaches have been developed that provide reagents for assays in dry stable form. Despite the known methods and devices for conducting assays, there exists a need for improved assay modules and methods of their production using automation to increase throughput and consistency.

SUMMARY OF THE INVENTION

In one aspect, the present disclosure provides a method of generating a multiwell substrate having a lyophilized reagent. The method includes: a) providing or generating a multiwell substrate having a plurality of wells formed therein; b) depositing a liquid reagent in each of the plurality of wells; and c) lyophilizing the liquid reagent, thereby drying the reagent and forming a lyophilized reagent, such as a disc, bead or the like, within each of the plurality of wells and generating the multiwell substrate having the lyophilized reagent.

In another aspect, the present disclosure provides a method of generating a plurality of multiwell substrates having a lyophilized reagent. The method includes: a) providing or generating at least two multiwell substrates, each substrate having a plurality of wells formed therein; b) depositing a liquid reagent in each of the plurality of wells; and c) lyophilizing the liquid reagent, thereby drying the reagent and forming a lyophilized reagent which can be in the form of a disc, bead, or the like, within each of the plurality of wells and generating at least two multiwell substrates having the lyophilized reagent. In embodiments, the method includes stacking at least 2, 3, 4, 5, 6, 7, 8, 9, 10 or more multiwell substrates having liquid reagent deposited in each of the plurality of wells in a lyophilization device and simultaneously drying the reagent.

In still another aspect, the present disclosure provides a multiwell substrate produced by the method of the invention.

In various embodiments, the lyophilized reagent contained within wells of a multiwell substrate of the disclosure are manipulated and/or transported using automation.

In yet another aspect, the present disclosure provides a method of performing an assay. The method includes using automation to transport a lyophilized reagent from a well of a multiwell substrate generated via the method of the invention to an assay device, and performing an assay using the assay device.

BRIEF DESCRIPTION OF THE FIGURES

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF THE INVENTION

Figure 1:
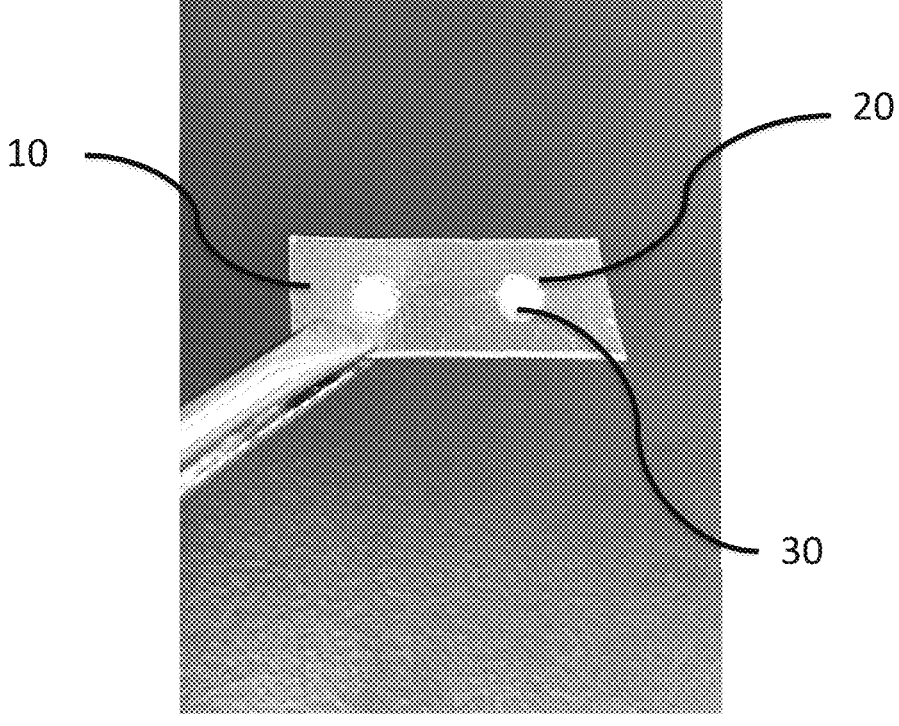
FIG. 1 shows a multiwell substrate generated using the method of the invention in one embodiment of the disclosure. Lyophilized reagent is present in each well.

The present disclosure is based on an innovative method for generating lyophilized reagents bin a high throughput format. The method allows for lyophilization of small volumes of reagents in a multiwell format. Lyophilization is performed using a multiwell substrate and includes automation to manipulate and/or transport lyophilized. The presently described methodology generates lyophilized reagent (s) in a manner that is less costly and more efficient and results in a simplified user workflow and facilitates use of automation to increase throughput. The lyophilized reagents may be used directly by the end user to conduct an assay without the need to add additional reagents thereby increasing reliability of assay results and reducing inconsistencies due to lot-to-lot variation in reagents.

Before the present compositions and methods are described, it is to be understood that this invention is not limited to particular methods and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure and so forth.

Unless defined otherwise, all technical and scientific terms used herein have the same meaning as commonly understood by one of ordinary skill in the art to which this invention belongs. Although any methods and materials similar or equivalent to those described herein can be used in the practice or testing of the invention, the preferred methods and materials are now described.

The present disclosure provides a method of manufacturing lyophilized reagents as well as multiwell substrates include lyophilized reagents which may be used in variety of applications, such as biological and chemical assays as well as in vitro diagnostics and therapeutics.

As used herein, "lyophilization" is the removal of solvent from the frozen state by sublimation. Lyophilization is accomplished by freezing the solution below its melting point and then manipulating the temperature and pressure to provide sublimation. Precise control of temperature and pressure permits drying from the frozen state without product melt-back. In practical applications, the process is accelerated and more precisely controlled under reduced pressure conditions.

As used herein, "lyophilizate" is the solid, powder or granular material remaining after lyophilization. The solid, powder or granular material is essentially free of solvent.

In one aspect, the present disclosure provides a method of generating a multiwell substrate having a lyophilized reagent and optionally, manipulation of lyophilized reagents using automation. The method includes: a) providing or generating a multiwell substrate having a plurality of wells formed therein; b) depositing a liquid reagent in each of the plurality of wells; and c) lyophilizing the liquid reagent, thereby drying the reagent and forming a lyophilized reagent within each of the plurality of wells and generating the multiwell substrate having the lyophilized reagent.

The present disclosure further provides a method of simultaneously generating a plurality of multiwell substrates having a lyophilized reagent. The method includes: a) providing or generating at least two multiwell substrates, each substrate having a plurality of wells formed therein; b) depositing a liquid reagent in each of the plurality of wells; and c) lyophilizing the liquid reagent, thereby drying the reagent and forming a lyophilized reagent within each of the plurality of wells and generating at least two multiwell substrates having the lyophilized reagent. In embodiments, the method includes stacking the at least two multiwell substrates having liquid reagent deposited in each of the plurality of wells in a lyophilization device and simultaneously drying the reagent.

In various embodiments, the methodology of the disclosure utilizes small volumes of liquid reagent thereby reducing cost of manufacture and allowing generation of unidose devices. In production of lyophilized reagents (e.g., lyophilized bead or disc), a small volume of liquid reagent is deposited within each well of the multiwell substrate. In embodiments the amount of liquid reagent deposited is about 0.001 to 100 µl, including 0.01 to 50, 0.1 to 10, 0.1 to 5, 1.0 to 5, or 2 to 3 µl. In embodiments the amount of liquid reagent deposited is equal about 1000, 900, 800, 700, 600, 500, 400, 300, 200, 100, 90, 80, 70, 60, 50, 40, 30, 20 or 10 nL, including 10 to 1000, 50 to 1000, 50 to 500, 50 to 250, or 100 to 250 µl.

Figure 2:
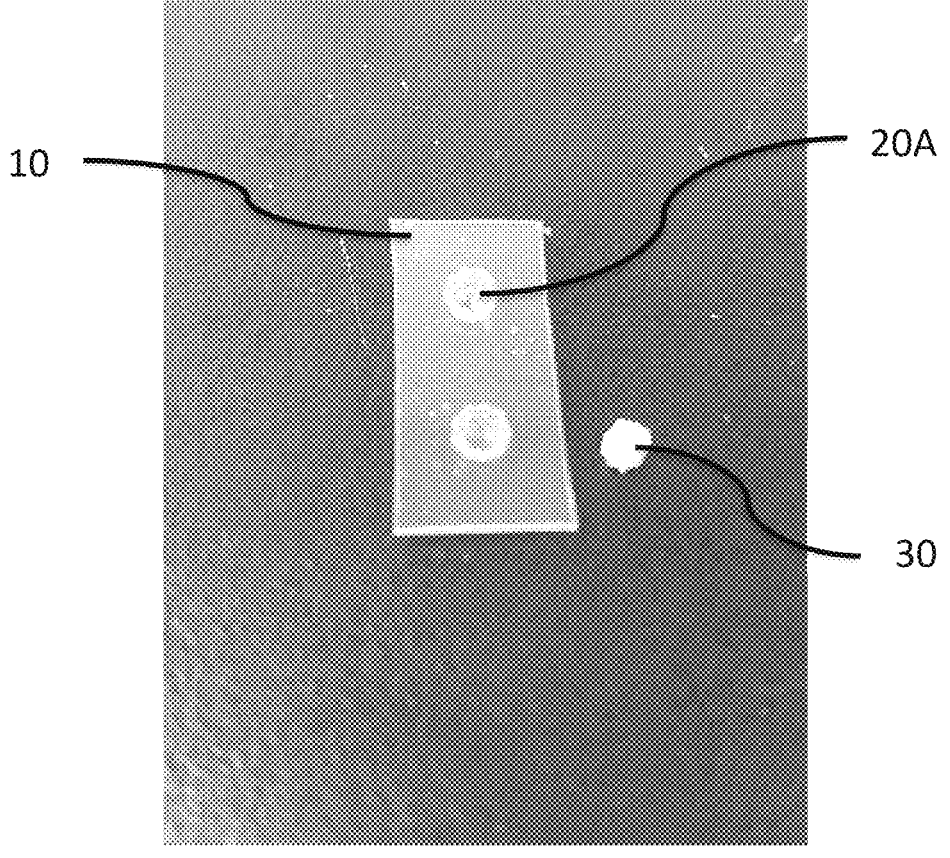
FIG. 2 shows a multiwell substrate generated using the method of the invention in one embodiment of the disclosure. A lyophilized reagent formed in a well of the substrate is shown removed from the well.
Figure 3:
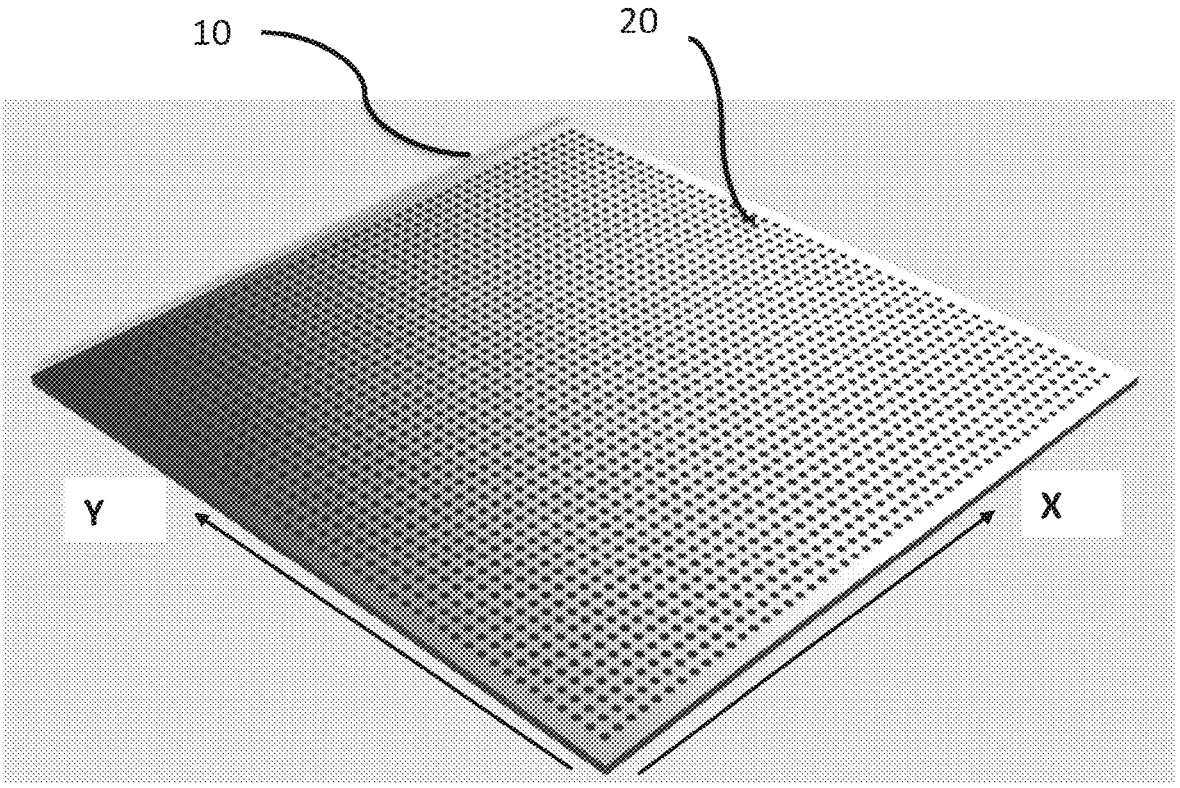
FIG. 3 shows a multiwell substrate having wells in a grid pattern. The individual wells have defined Cartesian coordinates for automated manipulation of lyophilized reagents.

The present disclosure also provides a multiwell substrate produced by the method of the invention. With reference to FIGS. 1-3, the multiwell substrate 10 includes a plurality of wells 20 which include a lyophilized reagent 30. FIG. 2 shows the lyophilized reagent 30 removed from a well 20 of the multiwell substrate 10 as a lyophilized bead.

The dried and/or lyophilized reagent within each well may be any reagent that can be dried and then reconstituted prior to use, for example in an assay. These include, but are not limited to, binding reagents useful in binding assays, enzymes, enzyme substrates, indicator dyes and other reactive compounds that may be used to detect an analyte of interest. The assay reagents may also include substances that are not directly involved in the mechanism of detection but play an auxiliary role in an assay including, but not limited to, blocking agents, stabilizing agents, detergents, salts, pH buffers, preservatives, diluents and excipients. Reagents may be present in free form or supported on solid phases including a surface 20A of the well of the device or a surface of colloids, beads, or other particulate supports within the well of the device. The assay reagents may also include biological cells or molecules including, but not limited to, cells, proteins (e.g., antibodies, and membrane, trans-membrane and cytosolic proteins), oligonucleotides, lipids, polysaccharides, nucleic acids, viral particles, ribosomes, antigens, hormones, ions and cofactors.

The multiwell substrate of the invention includes a plurality of wells formed in a substrate. The substrate may be composed of a variety of materials and may be flexible, semi-flexible or rigid. Suitable materials can include glass, ceramics, metals, plastics, polymers and combinations thereof. These materials for construction include non-polymeric and polymeric materials. In embodiments, one or more of the following, non-limiting examples of materials may be used in construction of the substrate including plastics (e.g., cyclic olefin copolymer (COC), cyclic olefin polymer (COP), polyethylene terephthalate (PET), polyethylene (PE), high-density polyethylene (HDPE), low-density polyethylene (LDPE), polyvinyl chloride (PVC), polypropylene (PP), polystyrene (PS), high impact polystyrene (HIPS), polyamides (PA), acrylonitrile butadiene styrene (ABS), polyethylene/acrylonitrile butadiene styrene (PE/ABS), polycarbonate (PC), polycarbonate/acrylonitrile butadiene styrene (PC/ABS), polymethylmethacrylate (PMMA)), metals, elastomers (e.g., polydimethylsiloxane (PDMS)), glass (e.g., borosilicate), ceramics, and composite materials, such as carbon fiber composites.

In various embodiments, the substrate, or portions thereof may be formed from a material which is compatible with biological material and/or molecules (e.g., biocompatible), such as cells or cellular components (e.g., nuclei, perinuclear compartments, nuclear membranes, mitochondria, chloroplasts, or cell membranes), proteins (e.g., antibodies, or membrane, trans-membrane or cytosolic proteins), oligonucleotides, lipids, polysaccharides, nucleic acids, viral particles, ribosomes, hormones, ions or cofactors.

The multiwell substrate of the invention may include any number of wells arranged in a manner suitable for automation and/or high throughput processes. For example, the multiwell substrate may include at least 2, 4, 8, 16, 24, 64, 96, 384, 1024, 2,500, 5,000, 10,000 or more wells. Further, each well of the substrate may include the same lyophilized reagent or combination of reagents. Alternatively, different wells of the substrate may include different reagents or combinations thereof such that a variety of different assays may be performed on or from a single substrate.

Further, the wells may be arranged in a pattern to facilitate automation. Two or more wells can be arranged on a multiwell substrate in a variety of different patterns and/or arrangements. In some embodiments, the wells are arranged in a grid pattern in columns and rows (e.g., forming a rectangle or a square). In some embodiments, the wells are arranged in offset columns and rows (e.g., forming a hex pattern). In some embodiments, the wells are arranged in a circle or concentric circles arranged about the center of the circle. In some embodiments, the arrangement of the wells on the multiwell substrate is encoded on a barcode (e.g., a two- or three dimensional barcode) on the multiwell substrate.

Wells on the substrate may be arranged horizontally. The wells may be arranged vertically. The wells may be arranged with equal or near equal spacing. The device may have markers associated with one or more wells. For example, the wells of the device may be divided into groups each comprised of a prescribed number of wells. These groups may be provided on the principal surface of the substrate. Markers may be provided so that the position of each group may be determined. A marker may be detectable by the naked eye. A marker may be a marker that requires optics to see (e.g., fluorescent marker, emission marker, UV marker).

The shape of the well may be cylindrical. The shape of the well may be noncylindrical, such as a polyhedron comprised of multiple faces (for example, a parallelepiped, hexagonal column, or octagonal column), an inverted cone, an inverted pyramid (inverted triangular pyramid, inverted square pyramid, inverted pentagonal pyramid, inverted hexagonal pyramid, or an inverted polygonal pyramid with seven or more angles). The well may comprise a shape combining two or more of these shapes. For example, it may be partly cylindrical, with the remainder having the shape of an inverted cone. The shape of the well may be one in which a portion of the top of an inverted cone or inverted pyramid is cut off. The bottom of the well may be flat, but curved surfaces (e.g., convex or concave) are also possible. The bottom of the well may be texturized by the addition of microscale geometries such as microchannels, microbumps, or other microscale shaped geometry. A well surface may be smooth. Alternatively, or additionally, a well surface may comprise divots, ridges, or wells. The bottom of the well may be partitioned such that each reagent remains separated when deposited. The shape and size of the well may be determined in consideration of the type of reagent to be stored in the well.

The diameter of the well may refer to the largest circle that may be inscribed in the planar shape of the well. The diameter of the well may be at least about 5, 10, 15, 20, 25, 30, 35, 40, 45, or 50, 55, 60, 65, 70, 75, 80, 85, 90, 100, 105, 110, 115, 120, 125, 130, 135, 140, 145, 150, 155, 160, 165, 170, 175, 180, 185, 190, 195, 200 mm or more.

One or more well surfaces may be functionalized. A surface may be referred to as "functionalized" when it includes a linker, a scaffold, a building block, or other reactive moiety attached thereto, whereas a surface may be "nonfunctionalized" when it lack such a reactive moiety attached thereto.

A functionalized surface may refer to the surface of the well comprising a functional group. A functional group may be a group capable of forming an attachment with another functional group. For example, a functional group may be biotin, which may form an attachment with streptavidin, another functional group. Exemplary functional groups may include, but are not limited to, aldehydes, ketones, carboxy groups, amino groups, biotin, streptavidin, nucleic acids, small molecules (e.g., for click chemistry), homo- and hetero-bifunctional reagents (e.g., N-succinimidyl(4-iodo-acetyl) aminobenzoate (STAB), dimaleimide, dithio-bis-ni-trobenzoic acid (DTNB), N-succinimidyl-S-acetyl-thioac-etate (SATA), N-succinimidyl-3-(2-pyridyldithio) propionate (SPDP), succinimidyl 4-(N-mafeimidomethyl)-cyclohexane-1-carboxylate (SMCC) and 6-hydrazinonic-otimide (HYNIC), and antibodies. In some instances the functional group is a carboxy group (e.g., COOH).

The functional groups on the well surface may be different for different positions on the surface of the well. The functional groups on the well surface may be the same for all regions of the well surface. For example, the entire bottom surface of the well may include the same functional group. Alternatively, different regions of the bottom surface may include different functional groups. Similarly, different regions of the sidewall surface may include different functional groups or the same functional groups.

The well surfaces may be treated or coated to render the surfaces hydrophilic or hydrophobic. A variety of surface treatments and surface modification techniques may be used to alter the properties of well surfaces. Examples include, but are not limited to, oxygen plasma treatments to render hydrophobic material surfaces more hydrophilic, the use of wet or dry etching techniques to smooth (or roughen) glass and silicon surfaces, adsorption and/or grafting of polyeth-ylene oxide or other polymer layers to substrate surfaces to render them more hydrophilic and less prone to non-specific adsorption of biomolecules and cells, the use of silane reactions to graft chemically-reactive functional groups to otherwise inert silicon and glass surfaces. Photodeprotection techniques can be used to selectively activate chemically-reactive functional groups at specific locations in the array structure, for example, the selective addition or activation of chemically-reactive functional groups such as primary ami-nes or carboxyl groups on the well surfaces may be used to covalently couple oligonucleotide probes, peptides, pro-teins, or other biomolecules to the well surfaces. In general, the choice of surface treatment or surface modification utilized will depend both on the type of surface property that is desired and on the type of material from which the substrate is made.

One of skill in the art would appreciate that depending of the type of substrate material being used, the well may be formed in the substrate using a variety of techniques known in the art. In various embodiments, the well may be formed via injection molding, vacuum forming, thermal forming, thermal debossing, milling, etching, photolithography or other technique commonly known in the art.

In various aspects, the disclosure provides a method of performing an assay. The method includes using automation to transport a lyophilized reagent from a well of a multiwell substrate generated via the method of the invention to an assay device, and performing an assay using the assay device.

Automation may include use of a robotic platform which includes functionality to pick-up or otherwise remove a lyophilized reagent from a well of a multiwell substrate, and transport the reagent to another location, such as a storage container, a different well on the same substrate, a well on a different substrate, an assay device, or the like. The automated platform may also include functionality to dis-perse liquid reagent into the wells of the multiwell substrate, control lyophilization, transport and store multiwell sub-strates.

Although the invention has been described with reference to the above disclosure, it will be understood that modifications and variations are encompassed within the spirit and scope of the invention. Accordingly, the invention is limited only by the following claims.

What is claimed is:

1. A method of producing a multiwell substrate having a lyophilized reagents in a multiwell substrate comprising:

a) providing a multiwell substrate having a plurality of wells formed therein, wherein each of the plurality of wells has a surface in the well;

b) treating the surface in each of the plurality of wells with an oxygen plasma treatment to render the surface in each of the plurality of wells hydrophilic;

c) depositing a liquid reagent in each of the plurality of wells; and d) lyophilizing the liquid reagent in each of the plurality of wells, thereby freezing the liquid reagent below its melting point and reducing pressure to form a lyophilized reagent in the form of a disc within each of the plurality of wells of the multiwell substrate.

2. The method of claim 1, wherein depositing a liquid reagent comprises depositing about 0.0001 to 100 μl of liquid reagent in each of the plurality of wells.

3. The method of claim 1, wherein the substrate comprises glass, ceramics, metals, or polymers.

4. The method of claim 1, wherein the plurality of wells comprises at least 2, 4, 8, 16, 24, 64, 96, 384, 1024 or more wells.

5. The method of claim 4, wherein the wells are arranged in a grid pattern.

6. The method of claim 1, wherein the liquid reagent includes 2 or more different reagents.

7. The method of claim 6, wherein depositing a liquid reagent comprises depositing a first liquid reagent in a first well and depositing a second liquid reagent in a second well, wherein the first liquid reagent is different from the second liquid reagent.

8. The method of claim 1, further comprising removing the lyophilized reagent from a first well of the plurality of wells and transporting the lyophilized reagent to a different location than the first well.

9. The method of claim 8, wherein transporting the lyophilized reagent comprises transporting the lyophilized reagent using Cartesian coordinates.

10. The method of claim 8, wherein the different location is a second well of the plurality of wells different from the first well of the multiwell substrate.

11. The method of claim 1, further comprising storing the multiwell substrate having the lyophilized reagent.

* * * * *